US009113033B2

(12) United States Patent
Junuzovic et al.

(10) Patent No.: US 9,113,033 B2
(45) Date of Patent: Aug. 18, 2015

(54) MOBILE VIDEO CONFERENCING WITH DIGITAL ANNOTATION

(75) Inventors: Sasa Junuzovic, Kirkland, WA (US); Kori Inkpen Quinn, Redmond, WA (US); Anoop Gupta, Woodinville, WA (US); Aaron Hoff, Kirkland, WA (US); Gina Venolia, Bellevue, WA (US); Andreas Nowatzyk, San Jose, CA (US); Hrvoje Benko, Seattle, WA (US); Gavin Jancke, Sammamish, WA (US); John Tang, Palo Alto, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 227 days.

(21) Appl. No.: 13/596,464

(22) Filed: Aug. 28, 2012

(65) Prior Publication Data

US 2014/0063174 A1    Mar. 6, 2014

(51) Int. Cl.
*H04N 7/15* (2006.01)
*G06Q 10/10* (2012.01)
*H04L 12/18* (2006.01)

(52) U.S. Cl.
CPC .............. *H04N 7/15* (2013.01); *G06Q 10/101* (2013.01); *H04L 12/1822* (2013.01)

(58) Field of Classification Search
USPC ............................................ 348/14.02–14.12
See application file for complete search history.

(56) References Cited

U.S. PATENT DOCUMENTS

| 7,152,093 | B2 | 12/2006 | Ludwig et al. | |
|---|---|---|---|---|
| 7,191,462 | B1 | 3/2007 | Roman et al. | |
| 8,094,876 | B2 | 1/2012 | Lecomte et al. | |
| 8,112,702 | B2 | 2/2012 | Badoiu et al. | |
| 8,789,094 | B1* | 7/2014 | Singh et al. ...................... | 725/37 |
| 2005/0213739 | A1 | 9/2005 | Rodman et al. | |
| 2005/0251421 | A1 | 11/2005 | Chang et al. | |
| 2009/0256901 | A1* | 10/2009 | Mauchly et al. ........... | 348/14.07 |
| 2011/0043597 | A1 | 2/2011 | Greenwood et al. | |
| 2011/0158603 | A1* | 6/2011 | Krukar et al. .................. | 386/230 |
| 2011/0164105 | A1* | 7/2011 | Lee et al. .................... | 348/14.02 |
| 2011/0249024 | A1 | 10/2011 | Arrasvuori et al. | |
| 2011/0249073 | A1 | 10/2011 | Cranfill et al. | |
| 2011/0267419 | A1 | 11/2011 | Quinn et al. | |

(Continued)

FOREIGN PATENT DOCUMENTS

WO    2011/136786 A1    11/2011

OTHER PUBLICATIONS

Holmberg, C., S. Hakansson, G. Eriksson, Web real-time communication use-cases and requirements, RTCWEB Working Group, Oct. 4, 2011, pp. 25, The Internet Engineering Task Force (IETF).

(Continued)

*Primary Examiner* — Joseph J Nguyen
(74) *Attorney, Agent, or Firm* — Micah Goldsmith; Judy Kadoura; Micky Minhas

(57) ABSTRACT

A local user of a local mobile device is allowed to participate in a video conference session with a remote user of a remote mobile device. Live video can be shared between and collaboratively digitally annotated by the local and remote users. An application can also be shared between and collaboratively digitally annotated by the local and remote users. A digital object can also be shared between and collaboratively digitally annotated by the local and remote users.

19 Claims, 5 Drawing Sheets

(56) References Cited

U.S. PATENT DOCUMENTS

| | | |
|---|---|---|
| 2012/0084670 A1 | 4/2012 | Momchilov |
| 2012/0092436 A1 | 4/2012 | Pahud et al. |
| 2012/0206558 A1* | 8/2012 | Setton .................. 348/14.07 |
| 2012/0287218 A1* | 11/2012 | Ok ........................ 348/14.02 |
| 2013/0063539 A1* | 3/2013 | Sakuraba et al. ....... 348/14.02 |
| 2013/0080916 A1* | 3/2013 | Lopez et al. ................. 715/753 |
| 2013/0169741 A1* | 7/2013 | Witt et al. ................. 348/14.07 |

OTHER PUBLICATIONS

"International Search Report & Written Opinion for PCT Patent Application No. PCT/US2013/055896", Mailed Date: Jul. 7, 2014, Filed Date: Aug. 21, 2013, 10 Pages.

* cited by examiner

MOBILE VIDEO CONFERENCING WITH DIGITAL ANNOTATION

BACKGROUND

Due to factors such as economic globalization and ongoing advances in computing, data communication, and computer networking technologies, people across the globe are becoming increasingly mobile. Examples of such technology advances include the Internet, the World Wide Web, wireless local area and wide area networks, and mobile computing devices and applications. Various types of mobile computing devices are now commercially available which allow people to affordably and conveniently perform full-fledged computing and data communication activities while they are on the move. Smartphones and tablet computers are two examples of such devices. The popularity of mobile computing devices is growing rapidly, as is the types of mobile computing applications that are available. Accordingly, the number of people that regularly uses a mobile computing device to perform their online computing, communication, and information management tasks is growing rapidly. In fact, mobile computing devices have become a principal computing device for many people.

In addition to people becoming increasingly mobile, businesses and families are becoming increasingly geographically distributed. As a result, people in different geographic locations have an increasing desire to collaborate and exchange information in a live (i.e., dynamic and interactive) manner without having to spend the time, money and effort associated with traveling to a common geographic location. Video conferencing is a popular technique which provides for the live exchange of both video and audio information between two or more people who are situated remotely from one another and are linked by a data communication network. Video conferencing thus allows the people to collaborate and exchange information in a live manner.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Mobile video conferencing technique embodiments described herein generally allow a local user of a local mobile device to participate in a video conference session with a remote user of a remote mobile device, where the local and remote mobile devices are interconnected by a network, and the local mobile device includes a display screen, a front video capture device that is pointed toward the local user and captures live video of the local user, and a rear video capture device that is pointed away from the local user and captures live video of a scene that is in front of the local user. In one exemplary embodiment live video is received over the network from the remote mobile device and is displayed on the entire display screen. Upon the local user selecting either the live video of the local user, or the live video of the scene that is in front of the local user, the selected live video is transmitted over the network to the remote mobile device, and is also resized as necessary to fit within an inset sector on the display screen. The resized selected live video is then displayed within the inset sector. Whenever the local user makes a first digital annotation on the received live video, the first digital annotation is displayed on top of the received live video, and the first digital annotation is transmitted over the network to the remote mobile device. Whenever the remote user makes a second digital annotation on the selected live video, the second digital annotation is received over the network from the remote mobile device, the received second digital annotation is resized as necessary to fit within the inset sector, and the resized received second digital annotation is displayed on top of the resized selected live video.

In another exemplary embodiment the live video of the local user is transmitted over the network to the remote mobile device. Live video of the remote user is received over the network from the remote mobile device, the received live video is resized as necessary to fit within the inset sector on the display screen, and the resized received live video is displayed within the inset sector. Upon the local user opening an application on the entire display screen, a message to run the application is transmitted over the network to the remote mobile device. Whenever the local user makes a first digital annotation on the application, the first digital annotation is displayed on top of the application, and the first digital annotation is transmitted over the network to the remote mobile device. Whenever the remote user makes a second digital annotation on the application, the second digital annotation is received over the network from the remote mobile device, and the received second digital annotation is displayed on top of the application.

In yet another exemplary embodiment the live video of the local user is transmitted over the network to the remote mobile device. Live video of the remote user is received over the network from the remote mobile device, the received live video is resized as necessary to fit within the inset sector on the display screen, and the resized received live video is displayed within the inset sector. Upon the local user displaying a digital object on the entire display screen, the object is transmitted over the network to the remote mobile device. Whenever the local user makes a first digital annotation on the object, the first digital annotation is displayed on top of the object, and the first digital annotation is transmitted over the network to the remote mobile device. Whenever the remote user makes a second digital annotation on the object, the second digital annotation is received over the network from the remote mobile device, and the received second digital annotation is displayed on top of the object.

DESCRIPTION OF THE DRAWINGS

The specific features, aspects, and advantages of the mobile video conferencing technique embodiments described herein will become better understood with regard to the following description, appended claims, and accompanying drawings where:

DETAILED DESCRIPTION

Figure 1:
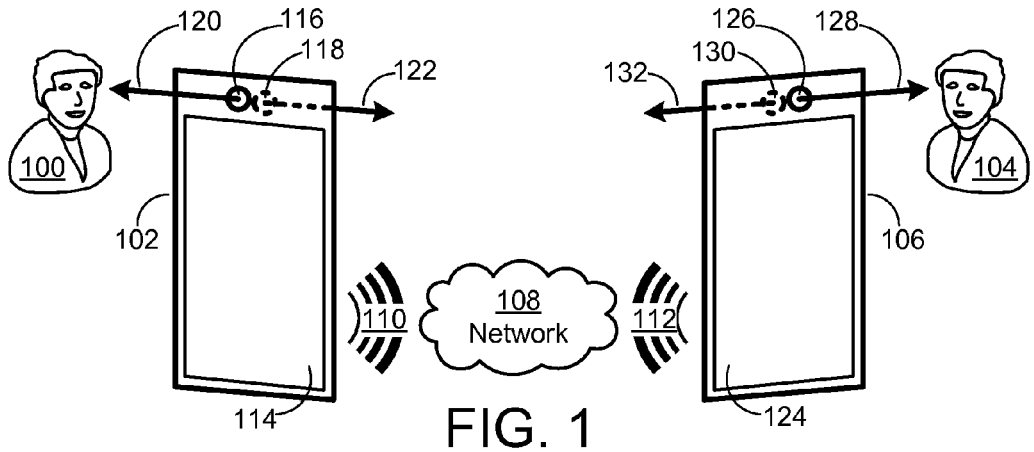
FIG. 1 is a diagram illustrating an exemplary embodiment, in simplified form, of an architectural framework for implementing the mobile video conferencing technique embodiments described herein.

In the following description of mobile video conferencing technique embodiments (hereafter simply referred to as conferencing technique embodiments) reference is made to the accompanying drawings which form a part hereof, and in which are shown, by way of illustration, specific embodiments in which the conferencing technique can be practiced. It is understood that other embodiments can be utilized and structural changes can be made without departing from the scope of the conferencing technique embodiments.

It is also noted that for the sake of clarity specific terminology will be resorted to in describing the conferencing technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the conferencing technique. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the conferencing technique does not inherently indicate any particular order not imply any limitations of the conferencing technique.

The term "screen-contacting gesture" is used herein to refer to either a physical tap or stroke that is made directly on a touch-sensitive display screen of a computing device by a user via a given user input modality. The term "mobile device" is used herein to refer to a networking-enabled, handheld, client computing device that is carried by a user and can run various mobile computing applications including, but not limited to, ones that enable Internet access. As is appreciated in the art of mobile computing technology, today's mobile devices include an integrated touch-sensitive display screen that can detect the presence, location, and path of movement if applicable, of screen-contacting gestures that the user makes on the display screen. Many of today's mobile devices also include an integrated front video capture device that is pointed toward the user, and may further include an integrated rear video capture device that is pointed away from the user. The latest generations of smartphones and tablet computers are but two examples of mobile devices that include an integrated touch-sensitive display screen, front video capture device, and rear video capture device. For simplicity sake, the touch-sensitive display screen of a mobile device is hereafter simply referred to as a display screen.

The term "sector" is used herein to refer to a segmented region of a display screen in which a particular type of graphical user interface and/or information is displayed, or a particular type of function is performed by a user. The term "inset sector" is used herein to refer to a sector on the display screen within which secondary information (such as live video that is currently being either received from or transmitted to a remote user, among other things) is displayed. In one embodiment of the conferencing technique described herein the inset sector is implemented as a picture-in-picture element on the display screen. In another embodiment of the conferencing technique the inset sector is implemented as a semi-transparent overlay layer that fills the entire display screen.

1.0 Mobile Video Conferencing with Digital Annotation

Generally speaking, the conferencing technique embodiments described herein allow a local user of a local mobile device to participate in a video conference session with a remote user of a remote mobile device. The conferencing technique embodiments support a variety of different features which can be implemented either independently or in any combination. Various examples of these features are described in more detail hereafter.

The conferencing technique embodiments described herein are advantageous for various reasons including, but not limited to, the following. The conferencing technique embodiments generally provide for the bidirectional sharing of various items of digital information such as live video, snapshots thereof, digital objects, and applications, among others (hereafter sometimes simply referred to as items of digital information that are currently being shared) between the local and remote users participating in the video conference session. The conferencing technique embodiments also allow the users to participate in the session in an efficient and affordable manner regardless of where in the world they each happen to be located. In other words, the users do not have to spend the time and money associated with finding and utilizing a public video conference service and/or related facility in order to be able to participate in the session.

The conferencing technique embodiments described herein are also advantageous in that they allow the users to share and discuss their activities with each other in a wide variety of contexts and environments (e.g., outdoors, in neighborhoods, at sporting events, and at child-related events such as play activities and birthday parties, among others). In other words, the conferencing technique embodiments allow the users to flexibly communicate and collaborate with each other via video in almost any environment. The conferencing technique embodiments are also easy to deploy and easy to use. The conferencing technique embodiments are also compatible with various conventional mobile devices and various conventional data communication networks.

The conferencing technique embodiments described herein are also advantageous in that they generally optimize the quality, effectiveness and productivity of communication and collaborative interaction between the local and remote users participating in the video conference session. More particularly and as will be described in more detail hereafter, the conferencing technique embodiments allow virtual face-to-face interaction between the users at the same time they participate in other collaborative activities such as collaboratively viewing, manipulating and digitally annotating a given item of digital information that is currently being shared between the users. The conferencing technique embodiments also allow the users to freely move about while they are participating in the session (as opposed to having their physical location be limited to a position directly in front of a non-mobile/stationary computing device). As a result, the conferencing technique embodiments create a rich and satisfying video conference experience for the users.

1.1 Architectural Framework

FIG. 1 illustrates an exemplary embodiment, in simplified form, of an architectural framework for implementing the conferencing technique embodiments described herein. Generally speaking and as exemplified in FIG. 1, the conferencing technique embodiments allow a local user 100 of a local mobile device 102 to participate in a video conference session with a remote user 104 of a remote mobile device 106. The local and remote mobile devices and are interconnected by a distributed data communication network 108 (hereafter simply referred to as the network).

In the particular embodiment exemplified in FIG. 1, both the local and remote mobile devices 102 and 106 are connected to the network 108 via conventional wireless connections 110 and 112. As is appreciated in the art of communication networks, the network can be either a public communication network such as the Internet (among others), or a private communication network such as an intranet (among others). A given wireless connection 110 or 112 can be implemented in various ways depending on the particular type of mobile device 102 or 106 that is being used by its user 100 or 104 and the types of wireless network service that are currently available in the particular location where the user happens to be situated during the video conference session. By way of example but not limitation, the wireless connection 110 or 112 can be a conventional Wi-Fi local area network (LAN) connection to a conventional Wi-Fi access point device (not shown). The wireless connection 110 or 112 can also be a conventional cellular wide area network (WAN) connection which supports one or more different conventional mobile telecommunication data services such as GPRS (general packet radio service—also known as 2.5G), EDGE (enhanced data rates for GSM (global system for mobile communications) evolution—also known as 2.75G), 3G (third generation), and 4G (fourth generation), among others.

Referring again to FIG. 1, the local mobile device 102 includes various functional components which are integrated there-within. Examples of these functional components include, but are not limited to, a local display screen 114, a local front video capture device 116 (such as a compact video camera, or the like) that is pointed toward 120 the local user 100, and a local rear video capture device 118 (such as a compact video camera, or the like) that is pointed away 122 from the local user. Accordingly, the local front and rear video capture devices 116 and 118 are pointed in substantially opposite directions 120 and 122 such that the local front video capture device captures a live video stream (hereafter simply referred to as live video) of whatever is substantially in front of the local display screen, and the local rear video capture device captures live video of whatever is substantially behind the local display screen. The local mobile device can optionally also include additional functional components which are integrated there-within such as a local audio capture device (not shown) (such as a compact microphone, or the like), a local audio output device (not shown) (such as one or more compact loudspeakers, or the like), and functionality that enables the computing device to operate as a telephone. The local audio capture device captures live audio emanating from the local user and their surrounding environment.

Referring again to FIG. 1, the remote mobile device 106 similarly includes various functional components which are integrated there-within. Examples of these functional components include, but are not limited to, a remote display screen 124, a remote front video capture device 126 (such as a compact video camera, or the like) that is pointed toward 128 the remote user 104, and a remote rear video capture device 130 (such as a compact video camera, or the like) that is pointed away 132 from the remote user. Accordingly, the remote front and rear video capture devices 126 and 130 are pointed in substantially opposite directions 128 and 132 such that the remote front video capture device captures live video of whatever is substantially in front of the remote display screen, and the remote rear video capture device captures live video of whatever is substantially behind the remote display screen. The remote mobile device can optionally also include additional functional components which are integrated there-within such as a remote audio capture device (now shown) (such as a compact microphone, or the like), a remote audio output device (not shown) (such as one or more compact loudspeakers, or the like), and functionality that enables the computing device to operate as a telephone. The remote audio capture device captures live audio emanating from the remote user and their surrounding environment.

Referring again to FIG. 1, during a video conference session the local user 100 will generally either be holding the local mobile device 102 in one of their hands, or will place this device on a table top in front of them. In either case, the local user will generally be looking at the local display screen 114 during the video conference session so that the local front video capture device 116 will generally capture live video of the local user (e.g., their head and torso). As such, the live video of the local user can include various types of information such as the local user's eye gaze direction, facial expressions, body language, hand gestures, other body gestures, and the like. Whenever the local user is holding the local mobile device in one of their hands, the local rear video capture device 118 will generally capture live video of the scene that is substantially in front of the local user (i.e., whatever the local user may currently be looking at). Similarly, the remote user 104 will generally either be holding the remote mobile device 106 in one of their hands, or will place this device on a table top in front of them. In either case, the remote user will generally be looking at the remote display screen 124 during the video conference session so that the remote front video capture device 126 will generally capture live video of the remote user (e.g., their head and torso). As such, the live video of the remote user can include various types of information such as the remote user's eye gaze direction, facial expressions, body language, hand gestures, other body gestures, and the like. In another situation where the remote user is holding the remote mobile device in one of their hands, the remote rear video capture device 130 will generally capture live video of the scene that is substantially in front of the remote user (i.e., whatever the remote user may currently be looking at).

1.2 Video Sharing and Collaborative Digital Annotation Features

This section describes a video sharing feature and a collaborative digital annotation feature of the conferencing technique embodiments described herein.

Figure 2:
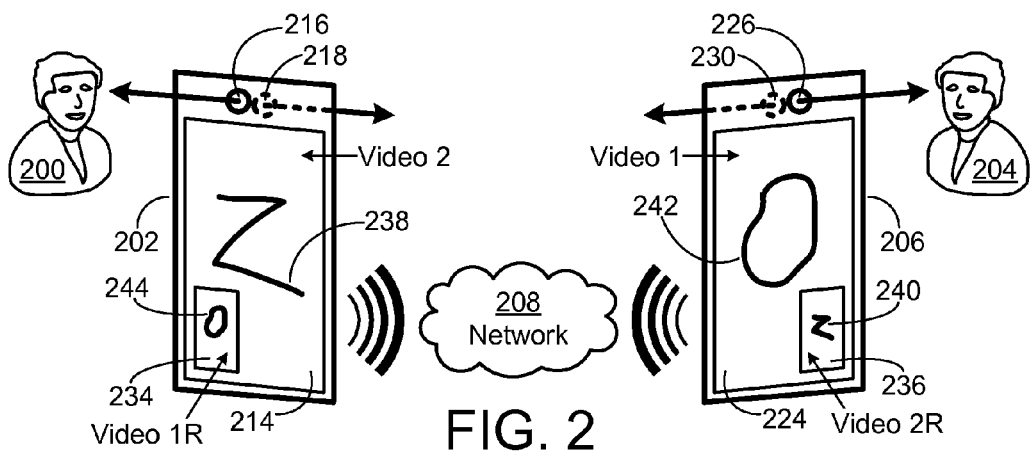
FIG. 2 is a diagram illustrating one embodiment, in simplified form, of a video sharing feature and a collaborative digital annotation feature of the conferencing technique embodiments described herein.

FIG. 2 illustrates one embodiment, in simplified form, of the video sharing feature and the collaborative digital annotation feature of the conferencing technique embodiments described herein. As exemplified in FIG. 2, during a video conference session the local user 200 can choose to send either the live video that is currently being captured by the local front video capture device 216 or the live video that is currently being captured by the local rear video capture device 218 to the remote user 204, and the local mobile device 202 will transmit the chosen live video (shown as Video 1) (hereafter sometimes referred to as the selected live video), along with the live audio that is currently being captured by the local audio capture device, over the network 208 to the remote mobile device 206. Similarly, the remote user can choose to send either the live video that is currently being captured by the remote front video capture device 226 or the live video that is currently being captured by the remote rear video capture device 230 to the local user, and the remote mobile device will transmit the chosen live video (shown as Video 2), along with the live audio that is currently being captured by the remote audio capture device, over the network to the local mobile device.

Referring again to FIG. 2, the local display screen 214 is configured in what is known as a picture-in-picture format where the live video that the local mobile device 202 receives over the network 208 from the remote mobile device 206 (i.e., Video 2) is displayed on the entire local display screen, the live video that the local mobile device is currently transmitting to the remote mobile device (i.e., Video 1) is resized as necessary to fit within an inset sector 234 on the local display screen, and this resized live video (shown as Video 1R) is displayed within this sector 234 (i.e., this sector 234 shows the local user 200 a preview of the live video they have chosen to send to the remote user 204). Similarly, the remote display screen 224 is also configured in a picture-in-picture format where the live video that the remote mobile device receives over the network from the local mobile device (i.e., Video 1) is displayed on the entire remote display screen, the live video that the remote mobile device is currently transmitting to the local mobile device (i.e., Video 2) is resized as necessary to fit within an inset sector 236 on the remote display screen, and this resized live video (shown as Video 2R) is displayed within this sector 236 (i.e., this sector 236 shows the remote user a preview of the live video they have chosen to send to the local user).

Referring again to FIG. 2, whenever the local mobile device 202 is displaying the live video (Video 2) it receives over the network 208 from the remote mobile device 206, the local mobile device can audibly reproduce the live audio it also receives over the network from the remote mobile device using the local audio output device. Similarly, whenever the remote mobile device is displaying the live video (Video 1) it receives over the network from the local mobile device, the remote mobile device can audibly reproduce the live audio it also receives over the network from the local mobile device using the remote audio output device. It will be appreciated that the live video and live audio a given mobile device receives over the network can be managed independently. More particularly and by way of example but not limitation, in a situation where the local user 200 minimizes the live video (Video 2) so that it is no longer being displayed on the entire local display screen 214, the local mobile device can continue to audibly reproduce the live audio that is associated with this live video (e.g., the local user can continue to hear the remote user's 204 voice even though their video (Video 2) is not longer being displayed). Additionally, the local user can choose to mute this live audio at any time, regardless of whether or not it associated live video is being displayed).

Generally speaking and referring again to FIG. 2, the conferencing technique embodiments described herein allow both the local user 200 and the remote user 204 to collaboratively digitally annotate (i.e., mark-up with digital ink) the live video they are receiving over the network from each other, where any such annotations made by one user are remotely visible to the other user in an appropriately resized and relocated form very shortly after the annotations are made. More particularly, whenever the local user makes a digital annotation 238 on the live video (Video 2) that is currently being displayed on the entire local display screen 214 (i.e., the live video the remote user has chosen to send to the local user), the local mobile device 202 will display the annotation 238 on top of the live video (Video 2) that is currently being displayed on the entire local display screen, and will also transmit the annotation over the network 208 to the remote mobile device 206. Upon receiving this digital annotation over the network from the local mobile device, the remote mobile device will resize the received annotation as necessary to fit within the inset sector 236 on the remote display screen 224, and will then display the resized annotation 240 on top of the live video (Video 2R) that is currently being displayed within this sector 236 (i.e., the preview of the live video the remote user has chosen to send to the local user). In other words and as exemplified in FIG. 2, the location and size of the digital annotation 238 that is made by the local user is mapped from the local display screen to the inset sector 236 on the remote display screen.

Similarly and referring again to FIG. 2, whenever the remote user 204 makes a digital annotation 242 on the live video (Video 1) that is currently being displayed on the entire remote display screen 224 (i.e., the live video the local user 200 has chosen to send to the remote user), the remote mobile device 206 will display the annotation 242 on top of the live video (Video 1) that is currently being displayed on the entire remote display screen, and will also transmit the annotation over the network 208 to the local mobile device 202. Upon receiving this digital annotation over the network from the remote mobile device, the local mobile device will resize the received annotation as necessary to fit within the inset sector 234 on the local display screen 214, and will then display the resized annotation 244 on top of the live video (Video 1R) that is currently being displayed within this sector 234 (i.e., the preview of the live video the local user has chosen to send to the remote user). In other words and as exemplified in FIG. 2, the location and size of the digital annotation 242 that is made by the remote user is mapped from the remote display screen to the inset sector 234 on the local display screen.

Generally speaking and referring again to FIG. 2, the conferencing technique embodiments described herein also allow both the local user 200 and the remote user 204 to collaboratively digitally annotate the live video they have chosen to send to each other, where any such annotations made by one user are remotely visible to the other user in an appropriately resized and relocated form very shortly after the annotations are made. More particularly, whenever the local user makes a digital annotation 244 on the live video (Video 1R) that is currently being displayed within the inset sector 234 on the local display screen 214 (i.e., the preview of the live video the local user has chosen to send to the remote user), the local mobile device 202 will display the annotation 244 on top of the live video (Video 1R) that is currently being displayed within this sector 234, and will also transmit the annotation over the network 208 to the remote mobile device 206. Upon receiving this digital annotation over the network from the local mobile device, the remote mobile device will resize the received annotation as necessary to fit on the entire remote display screen 224, and will then display the resized annotation 242 on top of the live video (Video 1) that is currently being displayed on the entire remote display screen. In other words and as exemplified in FIG. 2, the location and size of the digital annotation 244 that is made by the local user is mapped from the inset sector 234 on the local display screen to the remote display screen.

Similarly and referring again to FIG. 2, whenever the remote user 204 makes a digital annotation 240 on the live video (Video 2R) that is currently being displayed within the inset sector 236 on the remote display screen 224 (i.e., the preview of the live video the remote user has chosen to send to the local user 200), the remote mobile device 206 will display the annotation 240 on top of the live video (Video 2R) that is currently being displayed within this sector 236, and will also transmit the annotation over the network 208 to the local mobile device 202. Upon receiving this digital annotation over the network from the remote mobile device, the local mobile device will resize the received annotation as necessary to fit on the entire local display screen 214, and will then display the resized annotation 238 on top of the live video (Video 2) that is currently being displayed on the entire local display screen. In other words and as exemplified in FIG. 2, the location and size of the digital annotation 240 that is made by the remote user is mapped from the inset sector 236 on the remote display screen to the local display screen.

As is appreciated in the art of data communications, time lag is inherent in the network that interconnects the local and remote mobile devices and jitter may also be present in this network. Accordingly, it is possible for a given digital annotation that is made by one user on a given live video that is currently being displayed on one mobile device to be received over the network by another mobile device before the frames of the live video on which the annotation was made are received. In order to account for the time lag and any jitter that is present in the network, the conferencing technique embodiments described herein can time correlate each digital annotation that the local and remote users make to the particular frames of the particular live video upon which the annotation is made. As a result of this time correlation, a given digital annotation that is received over the network will not be displayed until the particular frames of the particular live video upon which the annotation was made are received, rendered and displayed.

Figure 8:
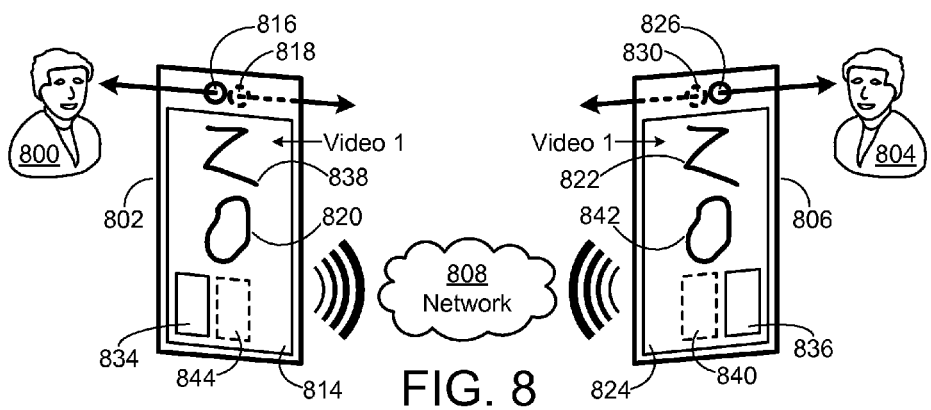
FIG. 8 is a diagram illustrating another embodiment, in simplified form, of the video sharing feature and the collaborative digital annotation feature of the conferencing technique embodiments described herein.

FIG. 8 illustrates another embodiment, in simplified form, of the video sharing feature and the collaborative digital annotation feature of the conferencing technique embodiments described herein. As exemplified in FIG. 8, during a video conference session the local user 800 can choose to display the live video that is currently being captured by the local rear video capture device 818 (which is shown as Video 1) on the entire local display screen 814, and also choose to send this live video to the remote user 804. The local mobile device 802 will display this live video (Video 1) on the entire local display screen 814, and will also transmit this live video, along with the live audio that is currently being captured by the local audio capture device, over the network 808 to the remote mobile device 806. When the remote mobile device 806 receives this live video (Video 1) over the network 808 from the local mobile device 802, the remote mobile device will display this live video on the entire remote display screen 824. Accordingly, in this particular embodiment both the local and remote users 800 and 804 will be viewing the same live video (namely Video 1) on their respective entire display screens 814 and 824 and the users can collaboratively digitally annotate this video as follows.

Referring again to FIG. 8, whenever the local user 800 makes a digital annotation 838 on the live video (Video 1) that is currently being displayed on the entire local display screen 814 (i.e., the live video the local user has chosen to send to the remote user 804), the local mobile device 802 will display the annotation 838 on top of the live video (Video 1) that is currently being displayed on the entire local display screen, and will also transmit the annotation over the network 808 to the remote mobile device 806. Upon receiving this digital annotation over the network 808 from the local mobile device 802, the remote mobile device 806 will display the received annotation 822, without it being resized or repositioned, on top of the live video (Video 1) that is currently being displayed on the entire remote display screen 824. Similarly, whenever the remote user 804 makes a digital annotation 842 on the live video (Video 1) that is currently being displayed on the entire remote display screen 824, the remote mobile device 806 will display the annotation 842 on top of the live video (Video 1) that is currently being displayed on the entire remote display screen 824, and will also transmit the annotation over the network 808 to the local mobile device 802. Upon receiving this digital annotation over the network 808 from the remote mobile device 806, the local mobile device 802 will display the received annotation 820, without it being resized or repositioned, on top of the live video (Video 1) that is currently being displayed on the entire local display screen 814.

Referring again to FIG. 8, the local mobile device 802 will also transmit the live video that is currently being captured by the local front video capture device 816 over the network 808 to the remote mobile device 806. Upon receiving this live video from the local mobile device 802, the remote mobile device 806 will resize it as necessary to fit within an inset sector 836 on the remote display screen 824, and will display this resized live video within this sector 836. Similarly, the remote mobile device 806 will also transmit the live video that is currently being captured by the remote front video capture device 826 over the network 808 to the local mobile device 802. Upon receiving this live video from the remote mobile device 806, the local mobile device 802 will resize it as necessary to fit within an inset sector 834 on the local display screen 814, and will display this resized live video within this sector 834.

Referring again to FIG. 8, the local mobile device 802 can optionally resize the live video that is currently being captured by the local front video capture device 816 as necessary to fit within another inset sector 844 on the local display screen 814, and display this resized live video within this sector 844 (thus providing the local user 800 with a preview of the live video that is currently being captured by the local front video capture device 816). Similarly, the remote mobile device 806 can optionally resize the live video that is currently being captured by the remote front video capture device 826 as necessary to fit within another inset sector 840 on the remote display screen 824, and display this resized live video within this sector 840 (thus providing the remote user 806 with a preview of the live video that is currently being captured by the remote front video capture device 826).

1.3 User-Modifiable Display Screen Configuration Features

A given user of a given mobile device can modify the configuration of their mobile device's display screen in various ways to meet their needs and optimize an interaction they are currently having with the other user during a video conference session. Examples of such ways include, but are not limited to, an inset sector repositioning feature, an inset sector resizing feature, and a view sharing feature, each of which will now be described in more detail.

Referring again to FIG. 2, the inset sector repositioning and resizing features of the conferencing technique embodiments described herein generally operate in the following manner. The local user 200 can reposition the inset sector 234 on the local display screen 214. Whenever the inset sector 234 is repositioned on the local display screen, the live video (Video 1R) and any digital annotations 244 which are currently being displayed there-within are repositioned accordingly. The local user can also resize the inset sector 234 on the local display screen. Whenever the inset sector 234 is resized on the local display screen, the live video (Video 1R) and any digital annotations 244 which are currently being displayed there-within are resized accordingly. The remote user 204 can similarly either reposition or resize the inset sector 236 on the remote display screen 224, and the live video (Video 2R) and any digital annotations 240 which are currently being displayed there-within will be either repositioned or resized accordingly. It will be appreciated that in addition to resizing and repositioning the inset sector, a given user can also close the inset sector so that it is completely removed from the display screen of their mobile device. A given user can also swap the live video and any digital annotations which are currently being displayed within their display screen's inset sector and the live video any digital annotations which are currently being displayed on their entire display screen (e.g., the local user 200 can move the Video 1R and its annotation 244 from the inset sector 234 to the entire local display screen 214, and move the Video 2 and its annotation 238 from the entire local display screen 214 to the inset sector 234).

Figure 3:
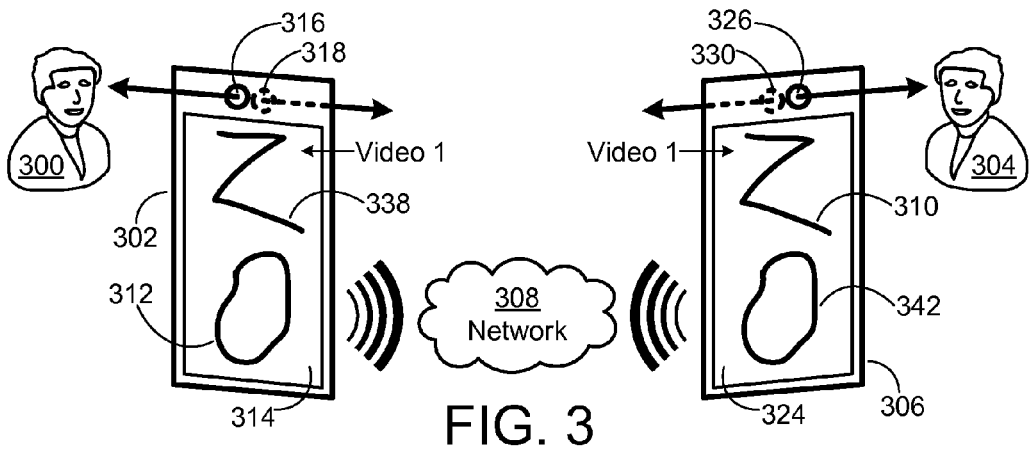
FIG. 3 is a diagram illustrating an exemplary embodiment, in simplified form, of a view sharing feature of the conferencing technique embodiments described herein.

FIG. 3 illustrates an exemplary embodiment, in simplified form, of the view sharing feature of the conferencing technique embodiments described herein. Generally speaking, the view sharing feature allows a given user to choose which live video is displayed on the entire display screen of their mobile device by using the just-described swap feature, among other ways. As a result, both the local and remote users 300 and 304 can view a common live video on their entire local and remote display screens 314 and 324 and collaboratively digitally annotate this common live video. In the particular embodiment exemplified in FIG. 3, whenever the local user 300 chooses to display the live video that they have chosen to send to the remote user 304 (i.e., the live video that is currently being captured by either the local front video capture device 316 or the local rear video capture device 318) (which is shown as Video 1), the local mobile device 302 will display the live video that they have chosen to send to the remote user on the entire local display screen 314. Accordingly, in this particular embodiment both the local and remote users will be viewing the same live video (namely Video 1) on their respective entire display screens and the users can collaboratively digitally annotate this video. More particularly and as exemplified in FIG. 3, whenever the local user makes a digital annotation 338 on the live video (Video 1) that is currently being displayed on the entire local display screen (i.e., the live video the local user has chosen to send to the remote user), the local mobile device will display the annotation 338 on top of the live video (Video 1) that is currently being displayed on the entire local display screen, and will also transmit the annotation over the network 308 to the remote mobile device 306. Upon receiving this digital annotation over the network from the local mobile device, the remote mobile device will display the received annotation 310, without it being resized or repositioned, on top of the live video (Video 1) that is currently being displayed on the entire remote display screen 324.

Similarly and referring again to FIG. 3, whenever the remote user 304 makes a digital annotation 342 on the live video (Video 1) that is currently being displayed on the entire remote display screen 324 (i.e., the live video the local user 300 has chosen to send to the remote user), the remote mobile device 306 will display the annotation 342 on top of the live video (Video 1) that is currently being displayed on the entire remote display screen, and will also transmit the annotation over the network 308 to the local mobile device 302. Upon receiving this digital annotation over the network from the remote mobile device, the local mobile device will display the received annotation 312, without it being resized or repositioned, on top of the live video (Video 1) that is currently being displayed on the entire local display screen 314.

Referring again to FIG. 3, it will be appreciated that an alternate embodiment (not shown) of the view sharing feature is also possible where, rather than the local user 300 changing the live video that is currently being displayed on the entire local display screen 314 as just described, the remote user 304 can similarly change the live video that is currently being displayed on the entire remote display screen 324 to be the live video that they have chosen to send to the local user (i.e., the live video that is currently being captured by either the remote front video capture device 326 or the remote rear video capture device 330). Accordingly, in this particular embodiment both the local and remote users will also be viewing the same live video (namely the live video that is currently being captured by either the remote front video capture device or the remote rear video capture device) on their respective entire display screens and the users can collaboratively digitally annotate this video in the just described manner.

It will also be appreciated that the view sharing feature is advantageous in situations where the local user is helping the remote user do something, or vice versa. By way of example but not limitation, consider a situation where a son and his mother are using the conferencing technique embodiments described herein to participate in a video conference session during which the son is helping his mother hook up a new high-end television she just purchased. The mother can point the rear video capture device on her mobile device at the block of connectors on the back of the television and all of the dangling cables to be attached thereto, and can then change the live video that is currently being displayed on the entire display screen on her mobile device to be the live video that is currently being captured by this rear video capture device (i.e., the live video of these connectors and dangling cables). Upon receiving and viewing this live video of the connectors and dangling cables on the entire display screen on his mobile device, the son can digitally annotate this video with information showing the mother which cables are to be attached to which connectors, and the mother can see his annotations on the video that is being displayed on her screen. The son and mother can also speak to each other and see each other via the aforementioned inset sectors on their respective display screens.

1.4 Video Snapshot Feature

This section describes a video snapshot feature of the conferencing technique embodiments described herein. The video snapshot feature generally allows both the local and remote users to view a common live video snapshot on their entire local and remote display screens and collaboratively digitally annotate this live video snapshot. More particularly, in an exemplary embodiment of the video snapshot feature the local user can take a snapshot of the live video they have chosen to send to the remote user. Whenever the local user takes such a snapshot, the local mobile device will display the snapshot on the entire local display screen, and will also transmit the snapshot over the network to the remote mobile device. Upon receiving the snapshot over the network from the local mobile device, the remote mobile device will display the snapshot on the entire remote display screen. Accordingly, both the local and remote users will be viewing the same snapshot on their respective entire display screens and the users can collaboratively digitally annotate this snapshot as follows.

Whenever the local user makes a digital annotation on the snapshot that is currently being displayed on the entire local display screen, the local mobile device will display the annotation on top of the snapshot that is currently being displayed on the entire local display screen, and will also transmit the annotation over the network to the remote mobile device. Upon receiving this digital annotation over the network from the local mobile device, the remote mobile device will display the received annotation, without it being resized or repositioned, on top of the snapshot that is currently being displayed on the entire remote display screen. Similarly, whenever the remote user makes a digital annotation on the snapshot that is currently being displayed on the entire remote display screen, the remote mobile device will display the annotation on top of the snapshot that is currently being displayed on the entire remote display screen, and will also transmit the annotation over the network to the local mobile device. Upon receiving this digital annotation over the network from the remote mobile device, the local mobile device will display the received annotation, without it being resized or repositioned, on top of the snapshot that is currently being displayed on the entire local display screen.

It is noted that any digital annotations that are made by the local or remote users can be anchored to the snapshot that is currently being displayed on the entire local and remote display screens. As a result, whenever a given user zooms in on (i.e., magnifies) the snapshot, any digital annotations that are currently being displayed on top of the snapshot will be magnified accordingly. Whenever the user zooms out on (i.e., shrinks/minifies) the snapshot, any digital annotations that are currently being displayed on top of the snapshot will be minified accordingly. Whenever the user scrolls the snapshot in a desired direction, any digital annotations that are currently being displayed on top of the snapshot will be scrolled accordingly.

It is also noted that the just described roles of the local and remote users can be reversed. In other words, in an alternate embodiment of the video snapshot feature the remote user can take a snapshot of the live video that they have chosen to send to the local user. Whenever the remote user takes such a snapshot, the remote mobile device will display the snapshot on the entire remote display screen, and will also transmit the snapshot over the network to the local mobile device. Upon receiving the snapshot over the network from the remote mobile device, the local mobile device will display the snapshot on the entire local display screen. Both the local and remote users can then collaboratively digitally annotate the snapshot in the just described manner.

In a default embodiment of the video snapshot feature the local mobile device transmits the live video that is currently being captured by the local front video capture device over the network to the remote mobile device, and upon receiving this live video the remote mobile device displays it within the inset sector on the remote display screen. Similarly, the remote mobile device transmits the live video that is currently being captured by the remote front video capture device over the network to the local mobile device, and upon receiving this live video the local mobile device displays it within the inset sector on the local display screen. Accordingly, in the inset sector on the local display screen the local user can see live video of whatever is substantially in front of the remote display screen (e.g., the remote user's head and torso), and in the inset sector on the remote display screen the remote user can see live video of whatever is substantially in front of the local display screen (e.g., the local user's head and torso). This allows each user to see live video of the other user while they are collaboratively discussing and annotating a given snapshot of the live video of whatever is substantially behind either the local or remote display screen (e.g., the scene that is substantially in front of either the local or remote user).

Alternate embodiments of the video snapshot feature are also possible where, as described heretofore, a given user can choose to send the live video that is currently being captured by their rear video capture device to the other user. In such a situation the given user's mobile device will transmit the live video that is currently being captured by its rear video capture device over the network to the other mobile device, and upon receiving this live video the other mobile device will display it within the inset sector on the other mobile device's display screen. Accordingly, in this inset sector the other user can see live video of whatever is substantially behind the given user's display screen.

It will be appreciated that the video snapshot feature can be useful in the aforementioned situation where the son is helping his mother hook up the television she just purchased. By way of example but not limitation, the mother can take a snapshot of the live video that is currently being captured by the rear video capture device on her mobile device (i.e., a snapshot of the block of connectors on the back of the television and all of the dangling cables to be attached thereto). Both the son and mother can then discuss the snapshot and annotate it as needed. It will also be appreciated that the video snapshot feature is advantageous in the common situation where the given user is unable to keep their mobile device substantially steady while they are holding it so that its front/rear video capture device is moving relative to the scene it is capturing. The reason for this is that the video snapshot feature allows any digital annotations which the user makes to maintain their orientation relative to an object in the snapshot on top of and/or around which the annotations were made.

1.5 Object Tracking and Image Stabilization Features

This section describes an object tracking feature and an image stabilization feature of the conferencing technique embodiments described herein.

The object tracking feature recognizes and tracks objects that exist in a live video upon which a user is making one or more digital annotations, and then anchors the annotations to these objects, where this object recognition and tracking is performed using conventional computer vision and artificial intelligence methods. It will thus be appreciated that the object tracking feature is advantageous in the aforementioned situation where a user is unable to keep their mobile device substantially steady so that its front/rear video capture device is moving relative to the scene it is capturing. The reason for this is that even if the front/rear video capture device moves or shakes while it is capturing live video of the scene (hence causing the position of objects that exist in the scene to change in the live video), the object tracking feature allows any digital annotations which the user makes to track the objects and maintain their orientation relative to the objects if the objects move. The object tracking feature can also be used to allow a user to annotate an object that is moving within the scene (e.g., circle a particular runner that is competing in a race at a track meet) and have the annotation move with the object as it moves within the scene.

The image stabilization feature performs conventional image stabilization processing on the live video that the local user has chosen to send to the remote user, and vice versa. The image stabilization feature thus minimizes the movement of objects that exist in this live video resulting from subtle movement or shaking of the local mobile device while the live video is being captured. As such, the image stabilization feature is also advantageous in the just mentioned situation where a user is unable to keep their mobile device substantially steady while the live video is being captured. It will be appreciated that it can be advantageous to combine the image stabilization and object tracking features since if image stabilization processing is first performed on the live video, it will be easier to recognize and track objects that exist therein.

1.6 Object Sharing Feature

This section describes an object sharing feature of the conferencing technique embodiments described herein. The object sharing feature generally allows a given user to share a desired digital object with the other user and collaboratively digitally annotate this object. Any type of digital object can be shared, examples of which include a map, a picture, and a document, among others. More particularly, in an exemplary embodiment of the object sharing feature the local user can display a desired digital object on the entire local display screen, upon which the local mobile device will transmit the object over the network to the remote mobile device. Upon receiving the digital object over the network from the local mobile device, the remote mobile device will display the object on the entire remote display screen. Accordingly, both the local and remote users will be viewing the same object on their respective entire display screens and the users can collaboratively digitally annotate the object as follows.

Whenever the local user makes a digital annotation on the digital object that is currently being displayed on the entire local display screen (such as when the local user digitally inks a route on a map that is currently being shared with the remote user), the local mobile device will display the annotation on top of the digital object that is currently being displayed on the entire local display screen, and will also transmit the annotation over the network to the remote mobile device. Upon receiving this digital annotation over the network from the local mobile device, the remote mobile device will display the received annotation, without it being resized or repositioned, on top of the digital object that is currently being displayed on the entire remote display screen (e.g., the remote user can see the route that the local user digitally inked on the map). Similarly, whenever the remote user makes a digital annotation on the digital object that is currently being displayed on the entire remote display screen, the remote mobile device will display the annotation on top of the digital object that is currently being displayed on the entire remote display screen, and will also transmit the annotation over the network to the local mobile device. Upon receiving this digital annotation over the network from the remote mobile device, the local mobile device will display the received annotation, without it being resized or repositioned, on top of the digital object that is currently being displayed on the entire local display screen.

It is noted that any digital annotations that are made by the local or remote users can be anchored to the digital object that is currently being displayed on the entire local and remote display screens. As a result, whenever a given user zooms in on (i.e., magnifies) the digital object, any digital annotations that are currently being displayed on top of the object will be magnified accordingly (e.g., the route that the local user digitally inked on the map appears correctly on the zoomed in map). Whenever the user zooms out on (i.e., shrinks/minifies) the digital object, any digital annotations that are currently being displayed on top of the object will be minified accordingly. Whenever the user scrolls the digital object in a desired direction, any digital annotations that are currently being displayed on top of the object will be scrolled accordingly. It is also noted that the just described roles of the local and remote users can be reversed. In other words, in an alternate embodiment of the object sharing feature the remote user can display a desired digital object on the entire remote display screen, upon which the remote mobile device will transmit the object over the network to the local mobile device. Upon receiving the digital object over the network from the remote mobile device, the local mobile device will display the object on the entire local display screen. Both the local and remote users can then collaboratively digitally annotate the digital object in the just described manner.

In a default embodiment of the object sharing feature the local mobile device transmits the live video that is currently being captured by the local front video capture device (e.g., the live video of the local user) over the network to the remote mobile device, and upon receiving this live video the remote mobile device resizes it as necessary to fit within the inset sector on the remote display screen, and then displays this resized live video within this inset sector. Similarly, the remote mobile device transmits the live video that is currently being captured by the remote front video capture device (e.g., the live video of the remote user) over the network to the local mobile device, and upon receiving this live video the local mobile device resizes it as necessary to fit within the inset sector on the local display screen, and then displays this resized live video within this inset sector. As described heretofore, this allows each user to see live video of the other user while they are collaboratively discussing and annotating a given digital object. Alternate embodiments of the object sharing feature are also possible where, as described heretofore, a given user can choose to send the live video that is currently being captured by their rear video capture device to the other user. In such a situation the given user's mobile device will transmit the live video that is currently being captured by its rear video capture device over the network to the other mobile device, and upon receiving this live video the other mobile device will resize it as necessary and then display this resized live video within the inset sector on the other mobile device's display screen.

1.7 Application Sharing Feature

This section describes an application sharing feature of the conferencing technique embodiments described herein. The application sharing feature generally allows a given user to share a desired application with the other user and collaboratively digitally annotate this application. Any type of application can be shared, examples of which include a web browser application, an interactive map application, and a photo gallery application, among others. More particularly, in an exemplary embodiment of the application sharing feature the local user can open an application on the entire local display screen, upon which the local mobile device will transmit a message to run the same application over the network to the remote mobile device. Upon receiving this message over the network from the local mobile device, the remote mobile device will open the application on the entire remote display screen. Accordingly, both the local and remote users will be running and viewing the same application on their respective entire display screens and the users can collaboratively digitally annotate the application as follows.

Whenever the local user makes a digital annotation on the application that is currently being displayed on the entire local display screen (such as when the local user digitally inks a circle around a particular image or information link that is currently being displayed in the application), the local mobile device will display the annotation on top of the application that is currently being displayed on the entire local display screen, and will also transmit the annotation over the network to the remote mobile device. Upon receiving this digital annotation over the network from the local mobile device, the remote mobile device will display the received annotation, without it being resized or repositioned, on top of the application that is currently being displayed on the entire remote display screen (e.g., the remote user can see the circle that the local user digitally inked on the application). Similarly, whenever the remote user makes a digital annotation on the application that is currently being displayed on the entire remote display screen, the remote mobile device will display the annotation on top of the application that is currently being displayed on the entire remote display screen, and will also transmit the annotation over the network to the local mobile device. Upon receiving this digital annotation over the network from the remote mobile device, the local mobile device will display the received annotation, without it being resized or repositioned, on top of the application that is currently being displayed on the entire local display screen.

It is noted that any digital annotations that are made by the local or remote users can be anchored to the application that is currently being displayed on the entire local and remote display screens. As a result, whenever a given user zooms in on (i.e., magnifies) the application, any digital annotations that are currently being displayed on top of the application will be magnified accordingly (e.g., the circle that the local user digitally inked on the application appears correctly on the zoomed in application). Whenever the user zooms out on (i.e., shrinks/minifies) the application, any digital annotations that are currently being displayed on top of the application will be minified accordingly. Whenever the user scrolls the application in a desired direction, any digital annotations that are currently being displayed on top of the application will be scrolled accordingly. It is also noted that the just described roles of the local and remote users can be reversed. In other words, in an alternate embodiment of the application sharing feature the remote user can open an application on the entire remote display screen, upon which the remote mobile device will transmit a message to run the same application over the network to the local mobile device. Upon receiving this message over the network from the remote mobile device, the local mobile device will open the application on the entire local display screen. Both the local and remote users can then collaboratively digitally annotate the application in the just described manner.

In a default embodiment of the application sharing feature the local mobile device transmits the live video that is currently being captured by the local front video capture device (e.g., the live video of the local user) over the network to the remote mobile device, and upon receiving this live video the remote mobile device resizes it as necessary to fit within the inset sector on the remote display screen, and then displays this resized live video within this inset sector. Similarly, the remote mobile device transmits the live video that is currently being captured by the remote front video capture device (e.g., the live video of the remote user) over the network to the local mobile device, and upon receiving this live video the local mobile device resizes it as necessary to fit within the inset sector on the local display screen, and then displays this resized live video within this inset sector. As described heretofore, this allows each user to see live video of the other user while they are collaboratively discussing and annotating a given application. Alternate embodiments of the application sharing feature are also possible where, as described heretofore, a given user can choose to send the live video that is currently being captured by their rear video capture device to the other user. In such a situation the given user's mobile device will transmit the live video that is currently being captured by its rear video capture device over the network to the other mobile device, and upon receiving this live video the other mobile device will resize it as necessary and then display this resized live video within the inset sector on the other mobile device's display screen.

Generally speaking, the conferencing technique embodiments described herein allow a given user to choose whether or not they want to have their view of the application that is open and running on their mobile device be synchronized with the other user's view of the same application that is open and running on the other user's mobile device. More particularly, the conferencing technique embodiments allow the user to choose between a WYSIWIS (what you see is what I see) application sharing mode (which can be thought of as a view-synchronized mode of the application sharing feature) and a WYSINWIS (what you see is not what I see) application sharing mode (which can be thought of as a non-view-synchronized mode of the application sharing feature).

There are various reasons why the local and remote users may want to be running the same application but not have the local and remote views of the application be synchronized. Some of these reasons are user-dependent and some are device-dependent. One example of such a user-dependent reason is that the local and remote users may want to independently move to different parts of the application. Another example of such a user-dependent reason is that the local and remote users may want to independently view data in different representations. For instance, one user may want to view some data as a bar chart, while the other user wants to view the data as a line chart. Yet another example of such a user-dependent reason is that a given user may want to see the just the results of their local interactions with the application (i.e., they don't want to have their view of the application be affected by the remote user's remote interactions with the application). An example of such a device-dependent reason is that the sizes and/or resolutions of the display screens on the local and remote mobile devices may be different (e.g., the screen of the local mobile device may be significantly smaller than the screen of the remote mobile device so that the local user may have to zoom in a lot to be able to see a desired level of detail.

Whenever the local and remote mobile devices are operating in the WYSIWIS application sharing mode, the results of the local user's interactions with the application that is open on the local display screen are also displayed on the remote display screen, and the results of the remote user's interactions with the application that is open on the remote display screen are also displayed on the local display screen (i.e., the local user's view of the application that is running on the local mobile device is synchronized with the remote user's view of the same application that is running on the remote mobile device). Whenever the local and remote mobile devices are operating in the WYSINWIS application sharing mode, the results of the local user's interactions with the application that is open on the local display screen are not displayed on the remote display screen, and the results of the remote user's interactions with the application that is open on the remote display screen are not displayed on the local display screen (i.e., the local user's view of the application that is running on the local mobile device is not synchronized with the remote user's view of the same application that is running on the remote mobile device). A user is able to switch between the WYSIWIS and WYSINWIS application sharing modes at any time.

1.8 Digital Annotation Modes and User Input Modalities

The conferencing technique embodiments described herein support various digital annotation modes including, but not limited to, a permanent annotation mode, an erasable annotation mode, and a transient annotation mode. It is noted that a given user can switch at will between these different digital annotation modes.

Whenever a given mobile device is operating in the permanent annotation mode, any digital annotations that are made on a given item of digital information that is currently being displayed on the display screen of the mobile device will continue to be displayed on top of this item for the duration of the video conference session. In other words and more generally speaking, in the permanent annotation mode any digital annotations that are made cannot be deleted for the duration of the session (i.e., the annotations are permanent).

Various implementations of the erasable annotation mode are possible, two of which will now be described in more detail. Whenever a given mobile device is operating in a local-only erasable annotation mode, a given digital annotation that is made by a given user can be deleted by just the user himself (no other user can delete the annotation). Whenever the remote user deletes a given digital annotation that they made, the annotation will be also be removed from the local display screen. Similarly, whenever the local user deletes a given digital annotation that they made, the annotation will be also be removed from the remote display screen. Whenever a given mobile device is operating in a global erasable annotation mode, a given user can delete any digital annotation that is currently being displayed on the display screen of their mobile device, regardless of which user made the annotation. Whenever the remote user deletes a given digital annotation that they made, the annotation will also be removed from the local display screen. Similarly, whenever the local user deletes a given digital annotation that they made, the annotation will also be removed from the remote display screen.

Whenever a given mobile device is operating in the transient annotation mode, any digital annotation that is made by either the local or remote user will fade out on a given display screen a prescribed period of time (e.g., five seconds) after the initial display of the annotation. In one embodiment of the transient annotation mode the annotation fades out uniformly. In another embodiment of the transient annotation mode the annotation fades out non-uniformly (e.g., the different points on the annotation can fade out independently in succession, thus providing the effect of a disappearing tail).

It will be appreciated that the collaborative digital annotation feature of the conferencing technique embodiments described herein is advantageous in that it gives both the local and remote users a convenient way to graphically communicate their thoughts/comments about a given item of digital information (e.g., a live video, or a snapshot thereof, or a digital object, or an application) that is currently being shared between them. A user can digitally annotate an item of digital information that is currently being displayed on the display screen of their mobile device in various ways using various user input modalities, where the annotation can include either text, or one or more diagrams/sketches, or a combination thereof. By way of example but not limitation, in one embodiment of the conferencing technique described herein the user can annotate the item of digital information by using a pointing device that physically contacts the mobile device's display screen in a region thereof where this item is being displayed. Whenever the user makes one or more strokes on the display screen on top of the item of digital information using the pointing device, each of the strokes is digitized thus creating a digital ink representation thereof (i.e., a digital representation which mimics the strokes), and this digitization is displayed on top of this item. The pointing device can be either a pen/stylus that the user holds, or one or more of the user's fingers, among other things. In another embodiment of the conferencing technique the user can annotate the item of digital information by placing one or more fingers in close proximity to the display screen, thus creating a "finger shadow" on the screen, and then moving their fingers in an appropriate manner to articulate the desired annotation. In yet another embodiment of the conferencing technique the user can annotate the item of digital information by using either a keyboard, or a joystick, among other types of user input devices.

1.9 Virtual Pointing Feature

This section describes a virtual pointing feature of the conferencing technique embodiments described herein. The virtual pointing feature generally allows a given user to remotely point at a specific location on a given item of digital information (e.g., a live video, or a snapshot thereof, or a digital object, or an application) that is currently being shared with the other user. More particularly, in an exemplary embodiment of the virtual pointing feature the local user can use any of the aforementioned user input modalities to point at a specific location on an item of digital information that is currently being displayed on both the local display screen and the remote display screen. Whenever the local user does this pointing, the local mobile device will detect the specific location on the item of digital information that the local user is pointing at, and will then transmit data that identifies this specific location over the network to the remote mobile device. Upon receiving this data over the network from the local mobile device, the remote mobile device uses the data to display a pointer element (such as an arrow, or a cross-hair, or the like) on top of the item of digital information that is currently being displayed on the remote display screen, where the pointer element points at the same specific location on this item that is currently being pointing at by the local user. Whenever the local user changes the specific location on the item of digital information they are pointing at, the local mobile device will detect the change and will then transmit updated data that identifies this change over the network to the remote mobile device. Upon receiving this updated data over the network from the local mobile device, the remote mobile device will use the updated data to change the location of the pointer element that is currently being displayed on the remote display screen accordingly.

Similarly, the remote user can use any of the aforementioned user input modalities to point at a specific location on an item of digital information that is currently being displayed on both the local display screen and the remote display screen. Whenever the remote user does this pointing, the remote mobile device will detect the specific location on the item of digital information that the remote user is pointing at, and will then transmit data that identifies this specific location over the network to the local mobile device. Upon receiving this data over the network from the remote mobile device, the local mobile device will use the data to display a pointer element on top of the item of digital information that is currently being displayed on the local display screen, where the pointer element points at the same specific location on this item that is currently being pointing at by the remote user. Whenever the remote user changes the specific location on the item of digital information they are pointing at, the remote mobile device will detect the change and will then transmit updated data that identifies this change over the network to the local mobile device. Upon receiving this updated data over the network from the remote mobile device, the local mobile device will use the updated data to change the location of the pointer element that is currently being displayed on the local display screen accordingly.

It is noted that the virtual pointing feature leaves no digital ink on the item of digital information that is currently being shared between the local and remote users. Whenever the local user stops pointing at the specific location on the item of digital information that is currently being displayed on the local display screen, the remote mobile device will remove the pointer element from the remote display screen. Similarly, whenever the remote user stops pointing at the specific location on the item of digital information that is currently being displayed on the remote display screen, the local mobile device will remove the pointer element from the local display screen. In an exemplary embodiment of the virtual pointing feature conventional pointer trails can be implemented in order to enhance the visibility of the pointer element while it is being moved.

1.10 Display Heterogeneity Features

This section describes a screen resolution normalization feature and an independent zoom feature of the conferencing technique embodiments described herein. As will be appreciated from the more detailed description that follows, these particular features are associated with a WYSINWIS operational mode of the conferencing technique embodiments described herein.

Whenever the resolution of the local display screen is different than the resolution of the remote display screen, the screen resolution normalization feature adjusts the resolution of any item of digital information (e.g., a live video, or a snapshot thereof, or a digital object, or an application) and any digital annotations that are made thereon that the local mobile device receives from the remote mobile device to match the resolution of the local display screen. The screen resolution normalization feature thus makes any difference in screen resolution between the local and remote display screens transparent to the local and remote users.

Whenever the size of the local display screen is smaller than the size of the remote display screen, or the resolution of the local display screen is lower than the resolution of the remote display screen, the independent zoom feature allows the local user to zoom in on a desired region of a given item of digital information that is currently being displayed on the local display screen, and is also currently being displayed on the remote display screen, without this item being zoomed in on the remote display screen. The independent zoom feature thus provides both the local and remote users with the ability to see the same level of detail in the desired region of this item, and makes any difference in screen size or resolution between the local and remote display screens transparent to the local and remote users.

1.11 Recording, Replay and Remote Zoom Features

This section describes a recording feature, a replay feature, and a remote zoom feature of the conferencing technique embodiments described herein.

The recording feature automatically records a given video conference session and indexes the session while it is being recorded. It will be appreciated that this indexing can be implemented in various ways. By way of example but not limitation, in an exemplary embodiment of the recording feature the indexing of the session that is being recorded is based on when either the local user, or the remote user, is either talking, or making digital annotations (in many cases these are the parts of the session that the users are most interested in).

The replay feature generally allows a user to replay a desired part of a video conference session either while the session is currently taking place, or after the session is over. More particularly, whenever a given video conference session is currently underway and the session is being recorded and indexed, the replay feature allows both the local and remote users to pause the session, rewind the recorded session to a desired index point, and play the recorded session starting at the desired index point. The user who initiated this playing of the recorded session can choose a desired playback speed which can be either normal speed, or a speed that is slower than normal speed, or another speed that is faster than normal speed. The replay feature will replay the item of digital information (e.g., a live video, or a snapshot thereof, or a digital object, or an application) that was being shared between the local and remote users starting at the desired index point to which the session was rewound, and will also replay any digital annotations that were made on this item.

The replay feature supports two user-selectable modes, namely a synchronized replay mode and an independent replay mode. Whenever the local and remote mobile devices are operating in the synchronized replay mode and a given user plays the recorded session starting at a desired index point, this playing of the recorded session will be displayed on both the entire local and entire remote display screens (i.e., both the local and remote users will see the replay at approximately the same time). Whenever the local mobile device is operating in the independent replay mode and the local user plays the recorded session starting at a desired index point, this playing of the recorded session is prevented from being displayed on the remote mobile device (i.e., the replay of the session will be displayed on just the local display screen). Similarly, whenever the remote mobile device is operating in the independent replay mode and the remote user plays the recorded session starting at a desired index point, this playing of the recorded session is prevented from being displayed on the local mobile device (i.e., the replay of the session will be displayed on just the remote display screen). Whenever a video conference session is over but it was recorded and indexed, the replay feature allows any user to replay either the entire session or any desired part thereof.

The remote zoom feature generally allows a given user to remotely zoom either in or out on the scene that is currently being captured by the other user's front or rear video capture device. More particularly, whenever the local user is currently sending the live video that is currently being captured by the local front video capture device to the remote user, the remote user can remotely control the local front video capture device to zoom either in or out on the scene that is currently being captured thereby. Whenever the local user is currently sending the live video that is currently being captured by the local rear video capture device to the remote user, the remote user can also remotely control the local rear video capture device to zoom either in or out on the scene that is currently being captured thereby. Similarly, whenever the remote user is currently sending the live video that is currently being captured by the remote front video capture device to the local user, the local user can remotely control the remote front video capture device to zoom either in or out on the scene that is currently being captured thereby. Whenever the remote user is currently sending the live video that is currently being captured by the remote rear video capture device to the local user, the local user can also remotely control the remote rear video capture device to zoom either in or out on the scene that is currently being captured thereby. In one embodiment of the remote zoom feature the zooming is done using a conventional digital zoom method. In another embodiment of the remote zoom feature the zooming is done using a conventional optical zoom method.

1.12 Layering Options

This section describes various options for layering the different types of information that can be displayed on the display screen of a given mobile device.

In one embodiment of the conferencing technique described herein the contents of the inset sector are displayed in a semi-transparent manner on the local display screen. In the aforementioned situations where the contents of the inset sector include the live video that is currently being captured by the remote front video capture device (e.g., live video of the remote user's head and torso), this particular embodiment can give the illusion that the remote user is on the other side of the local display screen, immediately behind the digital information that is being shared between the users. In another embodiment of the conferencing technique the contents of the inset sector are displayed in a non-transparent manner on the local display screen.

Digital annotations that are made by a given user on a given item of digital information can be displayed on top of this item in various ways. By way of example but not limitation, in one embodiment of the conferencing technique described herein the digital annotations are displayed as an overlay layer on the item. In one implementation of this embodiment the overlay layer is anchored to the item so that whenever the user zooms in on the item the annotations are magnified accordingly, whenever the user zooms out on the item the annotations are minified accordingly, and whenever the user scrolls the item in a desired direction the annotations are scrolled accordingly. In another implementation of this embodiment the overlay layer is not anchored to the item so that the digital annotations will not be magnified/minified whenever the user zooms in/out on the item, and the annotations will not be scrolled whenever the user scrolls the item. In another embodiment of the conferencing technique the digital annotations are displayed by setting the color of the appropriate pixels in the item to a prescribed color (such as blue, among other colors). It will be appreciated that this embodiment also serves to anchor the annotations to the item so that the annotations will be magnified/minified whenever the user zooms in/out on the item, and the annotations will be scrolled whenever the user scrolls the item.

1.13 Laser Pointing Feature

This section describes a laser pointing feature of the conferencing technique embodiments described herein. A given mobile device can optionally include a laser pointer device that is generally pointed away from the mobile device's user (i.e., the laser pointer device generally points in the same direction as the mobile device's rear video capture device). Various implementations of the laser pointer device are possible. By way of example but not limitation, the laser pointer device can be either integrated into the rear video capture device, or separately mounted on the rear of the mobile device. In one embodiment of the laser pointer feature the laser pointer device is a conventional non-steerable laser that points in a fixed direction which is substantially aligned with the axis of the rear video capture device. In another embodiment of the laser pointer feature the laser pointer device is a conventional steerable laser (e.g., a laser combined with a MEMs (micro-electro-mechanical systems) mirror) that points in a non-fixed direction which is controllable (i.e., steerable) by both the local and remote users.

Whenever the local mobile device includes a local laser pointer device the laser pointing feature of the conferencing technique embodiments described herein allows both the local and remote users to use the local laser pointer device to illuminate a real object of interest (i.e., "paint" the real object) in the scene that is substantially in front of the local user (and thus is currently being captured by the local rear video capture device) with a visible spot of light having a prescribed color (e.g., red, among other colors). It will be appreciated that this spot will be visible in the live video of this scene that is currently being captured by the local rear video capture device, and thus will also be visible to the remote user. Therefore, the laser pointing feature allows both the local and remote users to visually highlight/pinpoint a real object of interest in the scene that is substantially in front of the local user. Both the local and remote users will then see the highlighted real object, and can collaboratively discuss and digitally annotate it.

The aforementioned object tracking feature can be used to recognize and track the real object of interest in the scene upon which the visible spot of light is being illuminated, and then maintain this spot of light on this real object in the live video of the scene that is currently being captured and transmitted over the network. It will thus be appreciated that combining the laser pointing and object tracking features is advantageous whenever the local user is moving the local mobile device around the real object while the local laser pointer device is being used to illuminate the real object with the spot of light. Combining the laser pointing and object tracking features is also advantageous in another situation where slight movements of the local mobile device occur due to the local user's inability to keep the local mobile device perfectly steady while they are holding it and using the local laser pointer device to illuminate the real object with the small bright spot of light.

1.14 Process Framework

Figure 4:
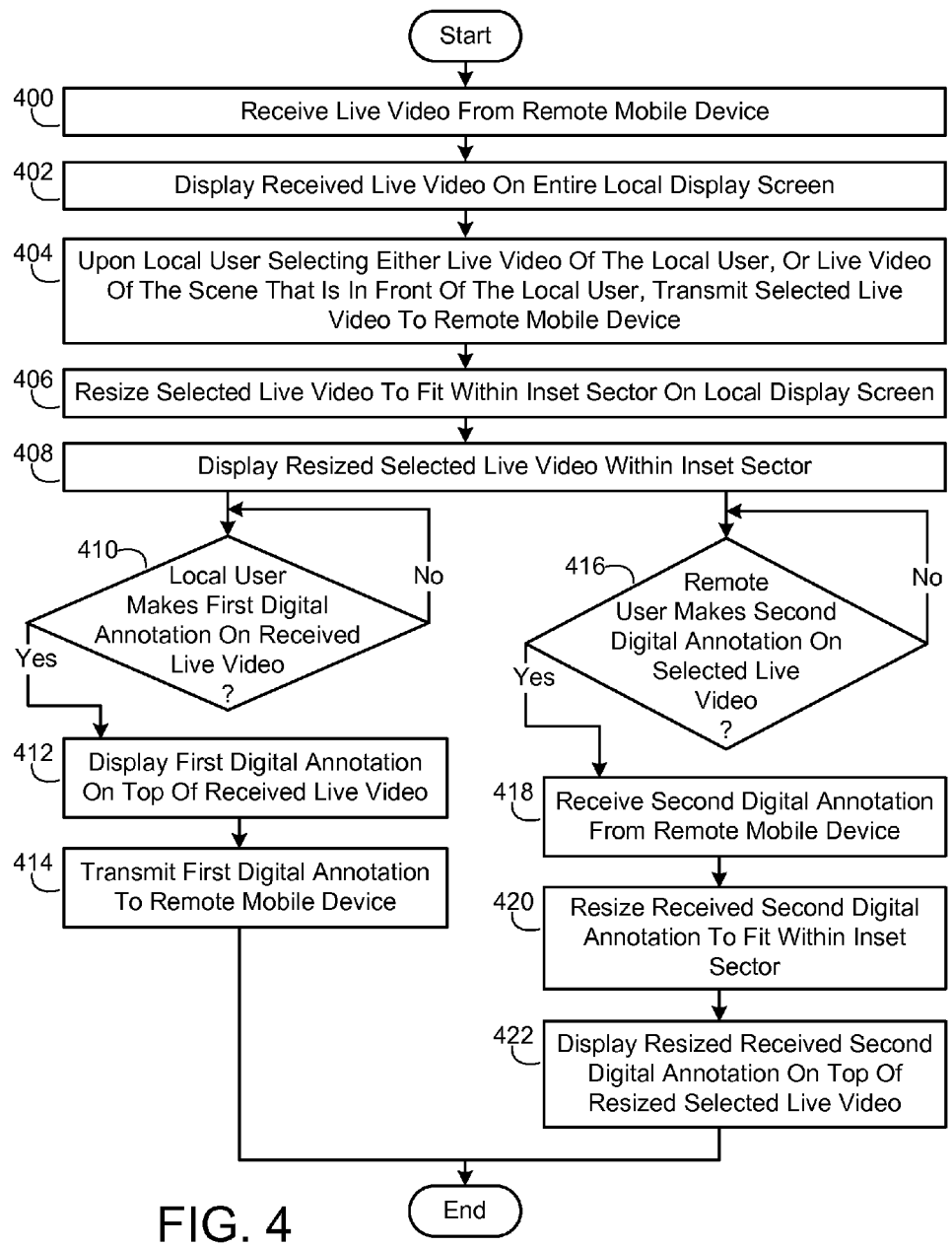
FIG. 4 is a flow diagram illustrating one embodiment, in simplified form, of a process for allowing a local user of a local mobile device to participate in a video conference session with a remote user of a remote mobile device.

FIG. 4 illustrates one embodiment, in simplified form, of a process for allowing the local user of the local mobile device to participate in a video conference session with the remote user of the remote mobile device. As exemplified in FIG. 4, the process starts in block 400 with receiving live video over the network from the remote mobile device. The received live video is then displayed on the entire local display screen (block 402). Upon the local user selecting either the live video of the local user (that is captured by the local front video capture device), or the live video of the scene that is in front of the local user (that is captured by the local rear video capture device), the selected live video is transmitted over the network to the remote mobile device (block 404). The selected live video is then resized as necessary to fit within the inset sector on the local display screen (block 406). The resized selected live video is then displayed within the inset sector (block 408). Whenever the local user makes a first digital annotation on the received live video (block 410, Yes), the first digital annotation is displayed on top of the received live video (block 412), and the first digital annotation is transmitted over the network to the remote mobile device (block 414). Whenever the remote user makes a second digital annotation on the selected live video (block 416, Yes), the second digital annotation is received over the network from the remote mobile device (block 418), the received second digital annotation is resized as necessary to fit within the inset sector (block 420), and the resized received second digital annotation is displayed on top of the resized selected live video (block 422).

Figure 5:
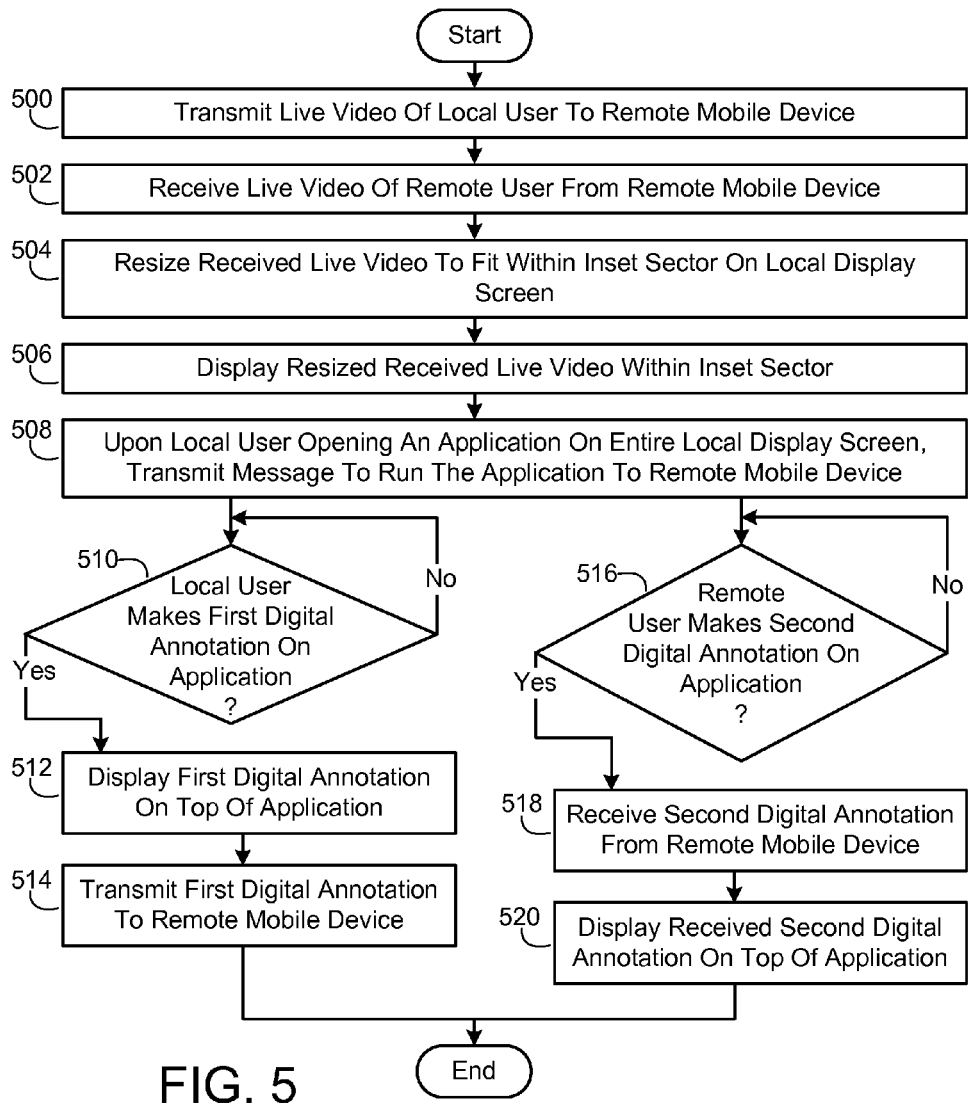
FIG. 5 is a flow diagram illustrating another embodiment, in simplified form, of a process for allowing the local user of the local mobile device to participate in a video conference session with the remote user of the remote mobile device.

FIG. 5 illustrates another embodiment, in simplified form, of a process for allowing the local user of the local mobile device to participate in a video conference session with the remote user of the remote mobile device. As exemplified in FIG. 5, the process starts in block 500 with transmitting the live video of the local user over the network to the remote mobile device. Live video of the remote user is then received over the network from the remote mobile device (block 502). The received live video is then resized as necessary to fit within the inset sector on the local display screen (block 504). The resized received live video is then displayed within the inset sector (block 506). Upon the local user opening an application on the entire local display screen, a message to run the application is transmitted over the network to the remote mobile device (block 508). Whenever the local user makes a first digital annotation on the application (block 510, Yes), the first digital annotation is displayed on top of the application (block 512), and the first digital annotation is transmitted over the network to the remote mobile device (block 514). Whenever the remote user makes a second digital annotation on the application (block 516, Yes), the second digital annotation is received over the network from the remote mobile device (block 518), and the received second digital annotation is displayed on top of the application (block 520).

Figure 6:
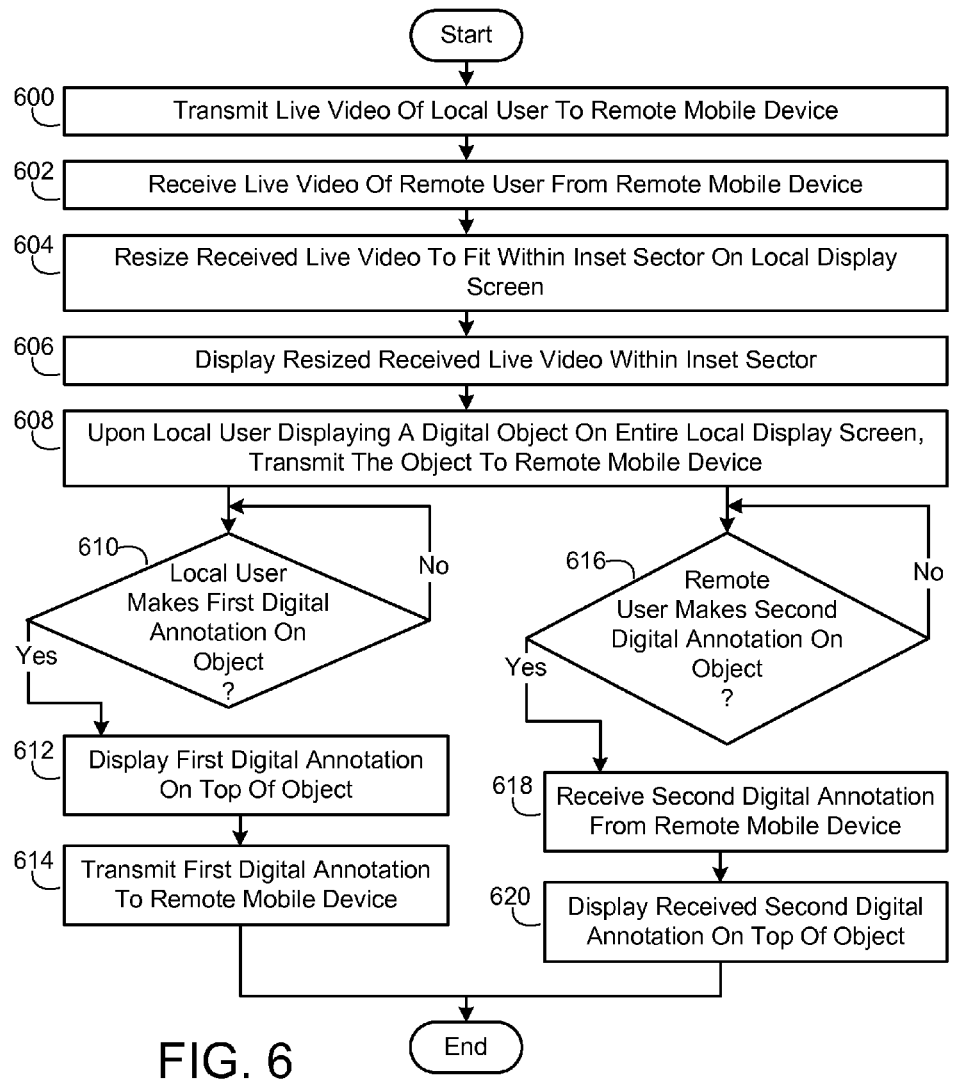
FIG. 6 is a flow diagram illustrating yet another embodiment, in simplified form, of a process for allowing the local user of the local mobile device to participate in a video conference session with the remote user of the remote mobile device.

FIG. 6 illustrates yet another embodiment, in simplified form, of a process for allowing the local user of the local mobile device to participate in a video conference session with the remote user of the remote mobile device. As exemplified in FIG. 6, the process starts in block 600 with transmitting the live video of the local user over the network to the remote mobile device. Live video of the remote user is then received over the network from the remote mobile device (block 602). The received live video is then resized as necessary to fit within the inset sector on the local display screen (block 604). The resized received live video is then displayed within the inset sector (block 606). Upon the local user displaying a digital object on the entire local display screen, the object is transmitted over the network to the remote mobile device (block 608). Whenever the local user makes a first digital annotation on the object (block 610, Yes), the first digital annotation is displayed on top of the object (block 612), and the first digital annotation is transmitted over the network to the remote mobile device (block 614). Whenever the remote user makes a second digital annotation on the object (block 616, Yes), the second digital annotation is received over the network from the remote mobile device (block 618), and the received second digital annotation is displayed on top of the object (block 620).

2.0 Additional Embodiments

While the conferencing technique has been described by specific reference to embodiments thereof, it is understood that variations and modifications thereof can be made without departing from the true spirit and scope of the conferencing technique. By way of example but not limitation and with regard to the video snapshot feature described herein, in addition to the local user being able to take a snapshot of the live video they have chosen to send to the remote user, the local user can also take a snapshot of the live video they are currently receiving from the remote user.

Furthermore, although the conferencing technique embodiments have been described herein in the context of a local user participating in a video conference session with a remote user, the conferencing technique embodiments are also operational in situations where three or more users (i.e., three or more mobile devices) are participating in a video conference session. Yet furthermore, although the conferencing technique embodiments have been described in the context of each of the users using a mobile device, the conferencing technique embodiments are also operational in situations where one or more of the users is using a networking-enabled client computing device that is larger than a mobile device and thus is generally not handheld (such as a desktop personal computer (PC), or a laptop computer, or the like), includes a front video capture device that is pointed toward the user, and may also be configured to include one or more of a rear video capture device that is pointed away from the user, or a touch-sensitive display screen. Yet furthermore, although the conferencing technique embodiments have been described in the context of a peer-to-peer framework where the mobile devices communicate directly with each other, the conferencing technique embodiments are also operational in a client-server framework where the mobile devices communicate with each other through a shared server.

Additionally, a video freeze-frame alternative to the video snapshot feature is possible where, rather than taking a snapshot of a given live video, the local user can freeze the live video to a specific frame. Upon the local user freezing the live video to a specific frame, the local mobile device will display the frozen frame on the entire local display screen, and will also transmit the frozen frame over the network to the remote mobile device. Upon receiving this frozen frame, the remote mobile device will display it on the entire remote display screen. Accordingly, both the local and remote users will be viewing the same frozen frame on their respective display screens and the users can collaboratively digitally annotate this frozen frame as described heretofore. The local user can subsequently "unfreeze" the live video, at which point the local and remote mobile devices will resume the video conferencing state they were in just before the local user invoked the freeze.

It is also noted that any or all of the aforementioned embodiments can be used in any combination desired to form additional hybrid embodiments. Although the conferencing technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

Figure 7:
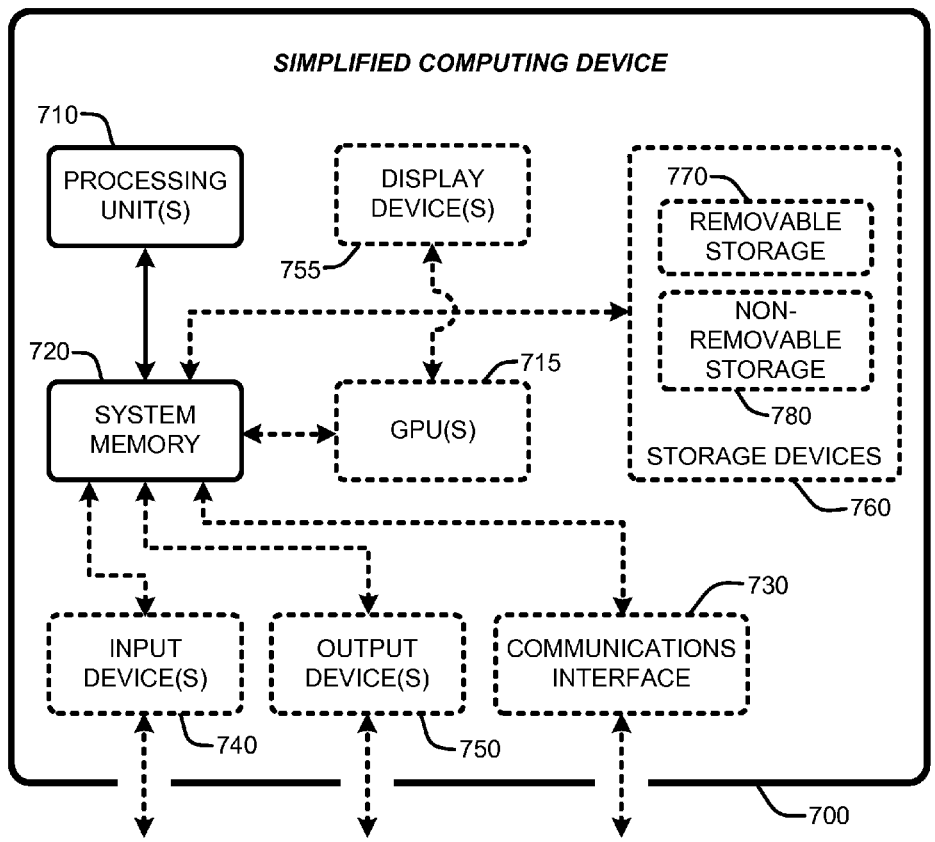
FIG. 7 is a diagram illustrating a simplified example of a general-purpose computer system on which various embodiments and elements of the mobile video conferencing technique, as described herein, may be implemented.

The conferencing technique embodiments described herein are operational within numerous types of general purpose or special purpose computing system environments or configurations. FIG. 7 illustrates a simplified example of a general-purpose computer system on which various embodiments and elements of the conferencing technique, as described herein, may be implemented. It is noted that any boxes that are represented by broken or dashed lines in FIG. 7 represent alternate embodiments of the simplified computing device, and that any or all of these alternate embodiments, as described below, may be used in combination with other alternate embodiments that are described throughout this document.

For example, FIG. 7 shows a general system diagram showing a simplified computing device 700. Such computing devices can be typically be found in devices having at least some minimum computational capability, including, but not limited to, personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the conferencing technique embodiments described herein, the device should have a sufficient computational capability and system memory to enable basic computational operations. In particular, as illustrated by FIG. 7, the computational capability is generally illustrated by one or more processing unit(s) 710, and may also include one or more graphics processing units (GPUs) 715, either or both in communication with system memory 720. Note that that the processing unit(s) 710 may be specialized microprocessors (such as a digital signal processor (DSP), a very long instruction word (VLIW) processor, or other micro-controller) or can be conventional central processing units (CPUs) having one or more processing cores including, but not limited to, specialized GPU-based cores in a multi-core CPU.

In addition, the simplified computing device 700 of FIG. 7 may also include other components, such as, for example, a communications interface 730. The simplified computing device 700 of FIG. 7 may also include one or more conventional computer input devices 740 (e.g., pointing devices, keyboards, audio (e.g., voice) input/capture devices, video input/capture devices, haptic input devices, devices for receiving wired or wireless data transmissions, and the like). The simplified computing device 700 of FIG. 7 may also include other optional components, such as, for example, one or more conventional computer output devices 750 (e.g., display device(s) 755, audio output devices, video output devices, devices for transmitting wired or wireless data transmissions, and the like). Note that typical communications interfaces 730, input devices 740, output devices 750, and storage devices 760 for general-purpose computers are well known to those skilled in the art, and will not be described in detail herein.

The simplified computing device 700 of FIG. 7 may also include a variety of computer readable media. Computer readable media can be any available media that can be accessed by the computer 700 via storage devices 760, and includes both volatile and nonvolatile media that is either removable 770 and/or non-removable 780, for storage of information such as computer-readable or computer-executable instructions, data structures, program modules, or other data. By way of example but not limitation, computer readable media may include computer storage media and communication media. Computer storage media includes, but is not limited to, computer or machine readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the conferencing technique described herein, or portions thereof, may be stored, received, transmitted, or read from any desired combination of computer or machine readable media or storage devices and communication media in the form of computer executable instructions or other data structures.

Finally, the conferencing technique embodiments described herein may be further described in the general context of computer-executable instructions, such as program modules, being executed by a computing device. Generally, program modules include routines, programs, objects, components, data structures, and the like, that perform particular tasks or implement particular abstract data types. The conferencing technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for allowing a local user of a local mobile device to participate in a video conference session with a remote user of a remote mobile device, wherein the local and remote mobile devices are interconnected by a network, and the local mobile device comprises a local display screen, a front video capture device that is pointed toward the local user and captures live video of the local user, and a rear video capture device that is pointed away from the local user and captures live video of a scene that is in front of the local user, comprising:
   using the local mobile device to perform the following process actions:
   receiving live video over the network from the remote mobile device;
   displaying the received live video on the local display screen;
   upon the local user selecting either the live video of the local user, or the live video of the scene that is in front of the local user, transmitting the selected live video over the network to the remote mobile device;
   resizing the selected live video as necessary to fit within an inset sector on the local display screen; and
   displaying the resized selected live video within the inset sector; and
   whenever the local user makes a first digital annotation on the received live video, displaying the first digital annotation on top of the received live video,
      recognizing and tracking objects that exist in the received live video, and
      anchoring the first digital annotation to said objects, wherein said anchoring allows the first digital annotation to track said objects and maintain its orientation relative to said objects if said objects move.

2. The process of claim 1, further comprising the actions of:
whenever the local user makes a first digital annotation on the received live video, transmitting the first digital annotation over the network to the remote mobile device;
whenever the remote user makes a second digital annotation on the selected live video, receiving the second digital annotation over the network from the remote mobile device, resizing the received second digital annotation as necessary to fit within the inset sector, and displaying the resized received second digital annotation on top of the resized selected live video;
whenever the local user makes a third digital annotation on the resized selected live video, displaying the third digital annotation on top of the resized selected live video, and transmitting the third digital annotation over the network to the remote mobile device; and
whenever the remote user makes a fourth digital annotation on the received live video, receiving the fourth digital annotation over the network from the remote mobile device, resizing the received fourth digital annotation as necessary to fit on the entire local display screen, and displaying the resized received fourth digital annotation on top of the received live video.

3. The process of claim 2, further comprising the actions of:
time correlating the first digital annotation to the particular frames of the received live video upon which the first digital annotation is made in order to account for time lag and any jitter that is present in the network; and
time correlating the third digital annotation to the particular frames of the resized selected live video upon which the third digital annotation is made in order to account for said time lag and jitter.

4. The process of claim 1, further comprising the actions of:
whenever the local user repositions the inset sector on the local display screen, repositioning the resized selected live video and the resized received second digital annotation accordingly; and
whenever the local user resizes the inset sector, resizing the resized selected live video and the resized received second digital annotation accordingly.

5. The process of claim 1, further comprising the actions of:
allowing the local user to choose which live video is displayed on the entire local display screen; and
whenever the local user chooses to display the selected live video on the entire local display screen, displaying the selected live video on the entire local display screen.

6. The process of claim 1, further comprising the actions of:
whenever the local user takes a snapshot of the selected live video, displaying said snapshot on the entire local display screen, and transmitting said snapshot over the network to the remote mobile device;
whenever the local user makes a local digital annotation on said snapshot, displaying the local digital annotation on top of said snapshot, and transmitting the local digital annotation over the network to the remote mobile device; and
whenever the remote user makes a remote digital annotation on said snapshot, receiving the remote digital annotation over the network from the remote mobile device, and displaying the received remote digital annotation on top of said snapshot.

7. The process of claim 6, further comprising an action of anchoring the local and remote digital annotations to the snapshot so that, whenever the local user zooms in on the snapshot said annotations are magnified accordingly, whenever the local user zooms out on the snapshot said annotations are minified accordingly, and whenever the local user scrolls the snapshot in a desired direction said annotations are scrolled accordingly.

8. The process of claim 6, further comprising the actions of:
whenever the local user points at a first location on the snapshot, detecting said first location, and transmitting data identifying said first location over the network to the remote mobile device; and
whenever the remote user points at a second location on the snapshot, receiving data identifying said second location over the network from the remote mobile device, and using said received data to display a pointer element on top of the snapshot, wherein the pointer element points at the second location on the snapshot.

9. The process of claim 1, further comprising an action of performing image stabilization processing on the selected live video.

10. The process of claim 1, further comprising the actions of:
whenever the local user makes a first digital annotation on the received live video transmitting the first digital annotation over the network to the remote mobile device;
whenever the remote user makes a second digital annotation on the selected live video, receiving the second digital annotation over the network from the remote mobile device, resizing the received second digital annotation as necessary to fit within the inset sector, and displaying the resized received second digital annotation on top of the resized selected live video;
whenever the local mobile device is operating in a permanent annotation mode, continuing to display the first digital annotation on top of the received live video for the duration of the session, and continuing to display the resized received second digital annotation on top of the resized selected live video for the duration of the session;
whenever the local mobile device is operating in a local-only erasable annotation mode, allowing just the local user to delete the first digital annotation, allowing just the remote user to delete the second digital annotation, and whenever the remote user deletes the second digital annotation, removing the resized received second digital annotation from the local display screen;
whenever the local mobile device is operating in a global erasable annotation mode, allowing the local user to delete either the first digital annotation or the resized received second digital annotation, and whenever the remote user deletes the second digital annotation, removing the resized received second digital annotation from the local display screen; and
whenever the local mobile device is operating in a transient annotation mode, fading out the first digital annotation being displayed on top of the received live video a prescribed period of time after the initial display of the first digital annotation, and fading out the resized received second digital annotation being displayed on top of the resized selected live video the prescribed period of time after the initial display of the resized received second digital annotation.

11. The process of claim 1, wherein the remote mobile device comprises a remote display screen, further comprising an action of, whenever the resolution of the local display screen is different than the resolution of the remote display screen, adjusting the resolution of the received live video to match the resolution of the local display screen.

12. The process of claim 1, wherein the local mobile device further comprises a laser pointer device that is pointed away from the local user, further comprising an action of allowing both the local and remote users to use the laser pointer device to illuminate a real object of interest in the scene that is in front of the local user with a visible spot of light, wherein said spot is visible in the live video of said scene and is thus is visible to the remote user.

13. The process of claim 12, wherein either,
the laser pointer device comprises a non-steerable laser that points in a fixed direction which is aligned with the axis of the rear video capture device, or
the laser pointer device comprises a steerable laser that points in a direction which is controllable by both the local and remote users.

14. The process of claim 1, further comprising the actions of:
recording the session; and
indexing the session while it is being recorded, wherein said indexing is based on when either the local user, or the remote user, is either talking, or making digital annotations.

15. The process of claim 14, further comprising the actions of:
allowing both the local and remote users to pause the session, rewind the recorded session to a desired index point, and play the recorded session starting at the desired index point;
whenever the local mobile device is operating in a synchronized replay mode and the remote user plays the recorded session starting at a first index point, displaying said playing of the recorded session starting at the first index point on the entire local display screen; and
whenever the local mobile device is operating in an independent replay mode and the local user plays the recorded session starting at a second index point, preventing said playing of the recorded session starting at the second index point from being displayed on the remote mobile device.

16. A computer-implemented process for allowing a local user of a local mobile device to participate in a video conference session with a remote user of a remote mobile device, wherein the local and remote mobile devices are interconnected by a network, and the local mobile device comprises a display screen and a front video capture device that is pointed toward the local user and captures live video of the local user, comprising:
using the local mobile device to perform the following process actions:
transmitting the live video of the local user over the network to the remote mobile device;
receiving live video of the remote user over the network from the remote mobile device;
resizing the received live video as necessary to fit within an inset sector on the display screen;
displaying the resized received live video within the inset sector;
upon the local user opening an application on the entice display screen, transmitting a message to run the application over the network to the remote mobile device;
whenever the local user makes a first digital annotation on the application, displaying the first digital annotation on top of the application, and transmitting the first digital annotation over the network to the remote mobile device; and
whenever the remote user makes a second digital annotation on the application, receiving the second digital annotation over the network from the remote mobile device, and displaying the received second digital annotation on top of the application.

17. The process of claim 16, further comprising an action of, whenever the local mobile device is operating in a what you see is what I see application sharing mode, synchronizing the view of the application that is open on the entire display screen with the view of the application that is being run on the remote mobile device.

18. The process of claim 16, further comprising an action of anchoring the first and second digital annotations to the application so that, whenever the local user zooms in on the application said annotations are magnified accordingly, whenever the local user zooms out on the application said annotations are minified accordingly, and whenever the local user scrolls the application in a desired direction said annotations are scrolled accordingly, wherein said anchoring comprises either displaying said annotations as an overlay layer on the application wherein said layer is anchored to the application, or displaying said annotations by setting the color of appropriate pixels in the application to a prescribed color.

19. A computer-implemented process for allowing a local user of a local mobile device to participate in a video conference session with a remote user of a remote mobile device, wherein the local and remote mobile devices are interconnected by a network, and the local mobile device comprises a display screen and a front video capture device that is pointed toward the local user and captures live video of the local user, comprising:
using the local mobile device to perform the following process actions:
transmitting the live video of the local user over the network to the remote mobile device;
receiving live video of the remote user over the network from the remote mobile device;
resizing the received live video as necessary to fit within an inset sector on the display screen;
displaying the resized received live video within the inset sector
upon the local user displaying a digital object on the entire display screen, transmitting said object over the network to the remote mobile device;
whenever the local user makes a first digital annotation on said object, displaying the first digital annotation on top of said object, and transmitting the first digital annotation over the network to the remote mobile device; and
whenever the remote user makes a second digital annotation on said object, receiving the second digital annotation over the network from the remote mobile device, and displaying the received second digital annotation on top of said object.

* * * * *